J. G. HALL.
MILK BOTTLE.
APPLICATION FILED APR. 8, 1921.

1,423,560.

Patented July 25, 1922.

INVENTOR
J. G. Hall.
BY J. Edward Maybee.
ATTY.

UNITED STATES PATENT OFFICE.

JOHN G. HALL, OF TORONTO, ONTARIO, CANADA.

MILK BOTTLE.

1,423,560.  Specification of Letters Patent.  Patented July 25, 1922.

Application filed April 8, 1921. Serial No. 459,562.

*To all whom it may concern:*

Be it known that I, JOHN G. HALL, of the city of Toronto, in the county of York, Province of Ontario, Canada, a subject of the King of Great Britain, have invented certain new and useful Improvements in Milk Bottles, of which the following is a specification.

This invention relates to improvements in milk bottles. With the type of bottle now in use, it is usual, when setting out the bottles, to drop the tickets into the bottom of the bottle. As the bottles are frequently put out in damp condition, the ticket will often stick to the bottom of the bottle, and in cold weather the ticket will become frozen thereto. The milkman therefore has often great difficulty in removing the ticket from the bottle, and often through the use of a stick or other object to free the ticket, the bottle is broken.

My object therefore is to devise means whereby tickets may be placed out with the bottle in such a way as to overcome the difficulties above referred to.

I attain my object by means of the constructions hereinafter described and illustrated in the accompanying drawings in which—

Figure 1:
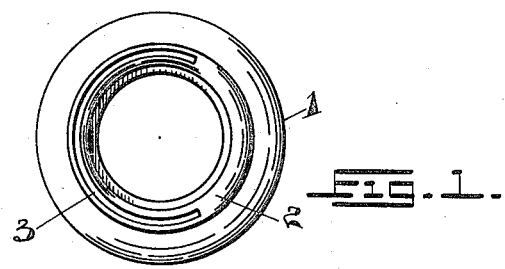
Figure 2:
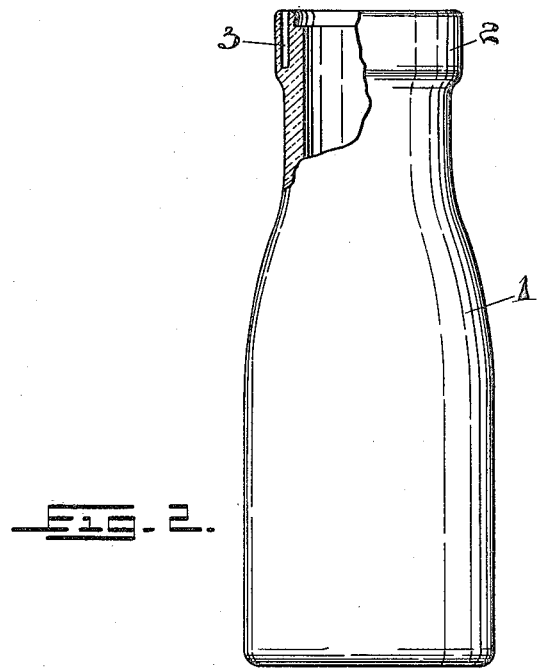

Fig. 1 is a plan view of a milk bottle constructed in accordance with my invention; and Fig. 2 a side elevation of the same, partly in section In the drawings like numerals of reference indicate corresponding parts in the different figures.

1 is a milk bottle of any ordinary form, of which 2 is the rim around its mouth. In the top of this rim is formed a narrow groove or pocket 3. This groove may extend entirely around the mouth of the bottle, but I prefer to leave about one-third of the circumference of the mouth without the groove. This groove will preferably be of such a depth that a ticket placed therein will extend sufficiently far above the top of the rim to be easily grasped. The milk will be poured out of the bottle over that part of the rim which is not grooved, and thus there will be no interference with the pouring, and the milk will not enter the groove.

From the above description it will be seen that I have satisfactorily devised a construction which will attain the objects of my invention as set forth in the preamble of this specification.

What I claim as my invention is:—

A bottle having a rim surrounding its mouth of greater thickness than the body of the bottle, said rim being of substantially even thickness throughout its circumference and having a substantially vertical ticket receiving recess formed entirely therein, the mouth of the recess extending through the upper edge of the rim.

Signed at Toronto, Can., this 22nd day of March, 1921.

JOHN G. HALL.